United States Patent [19]

Hung

[11] Patent Number: 4,802,681
[45] Date of Patent: Feb. 7, 1989

[54] WHEELBARROW

[76] Inventor: Tung-Ping Hung, No. 14 Lane 590 Hsin-Fu Road, Feng-Shan Kaohsuing, Taiwan

[21] Appl. No.: 134,483

[22] Filed: Dec. 17, 1987

[51] Int. Cl.[4] ............................................. B62B 3/02
[52] U.S. Cl. ............................. 280/47.18; 280/47.20; 280/47.22; 280/47.315; 403/102; 403/341
[58] Field of Search ............... 280/651, 652, 653, 654, 280/655, 638, 639, 659, 43.1, 47, 43.17, 43.18, 47.17, 47.18, 47.20, 47.21, 47.22 X, 47.27, 47.34, 47.37 R, 100; 403/102 X, 341 X

[56] References Cited

U.S. PATENT DOCUMENTS

| | | | |
|---|---|---|---|
| 729,931 | 6/1903 | Hart et al. | 280/47.22 |
| 2,650,834 | 9/1953 | Loval | 280/47.27 |
| 3,276,550 | 10/1966 | Honegman | 280/47.27 |
| 3,711,111 | 1/1973 | Crawford | 280/47.22 |
| 4,561,674 | 12/1985 | Alessio | 280/655 |
| 4,588,197 | 5/1986 | Benedetto, Jr. | 280/47.37 R |

*Primary Examiner*—David M. Mitchell
*Assistant Examiner*—Richard Camby
*Attorney, Agent, or Firm*—Varndell Legal Group

[57] ABSTRACT

An improved wheelbarrow is disclosed which has a body with a foldable rear section and stable front section, a rack, and front wheels fixed on both ends of a wheel axle. The wheel axle is supported at both its sides with a flexing case which provides elastic movement to the wheel axle by means of a spring and a pushing plate. A braking device for the front wheels is also disclosed, as well as auxiliary rear wheels. The wheelbarrow has three different configuration and is capable of safe movement while reducing the amount of force necessary for its use.

2 Claims, 5 Drawing Sheets

WHEELBARROW

BACKGROUND OF THE INVENTION

A conventional wheelbarrow has two wheels set on a constant immovable axle without any braking device and a body unchangeable in its form. A conventional wheelbarrow needs a considerable amount of force in order to be pushed in an inclined position when goods are carried thereon. Also, its speed cannot be controlled nor can it be stopped when going down a slope. Conventional wheelbarrows can easily speed down an inclined surface because of a heavy load and can even turn over. These are common defects found in an ordinary wheelbarrow used widely nowadays.

SUMMARY OF THE INVENTION

In view of the drawbacks, mentioned above, the inventor has worked out a new improved wheelbarrow having its body composed of two sections, a front and a rear section, two front wheels and two auxiliary rear wheels. The rear section of its body can be folded to extend outward from the front section or to be vertical to the front section, or folded backward to lie on the front section by means of a folding device. The wheelbarrow can be used as a two-wheeled device, or a four-wheeled device, as a user chooses. Also, it is very safe even when used on a downward slope with a heavy load, because brakes are provided for the front wheels. Whenever a user believes a dangerous condition exists, he can use the brake to slow down or to stop the wheelbarrow. Moreover, an important aspect of the invention is that the front wheel axle has a unique characteristic of elastic movement for reducing the amount of user force needed when he is using the wheelbarrow with a load. This is one of the improvements in the wheelbarrow of the present invention.

DETAILED DESCRIPTION OF THE INVENTION

Figure 1:
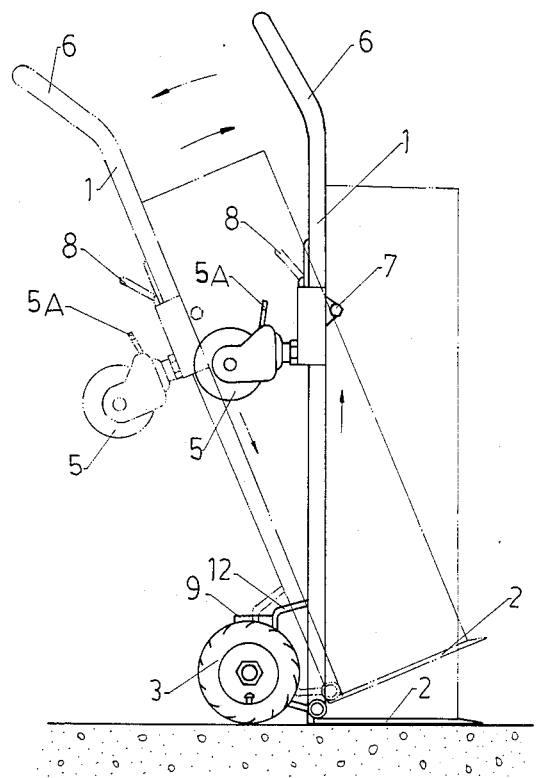
FIG. 1 is a view of the wheelbarrow used as a two-wheeled device in accordance with this invention.
Figure 2:
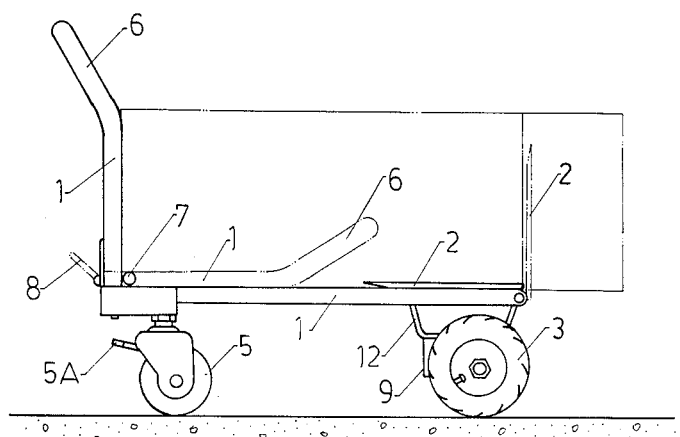
FIG. 2 is a view of the wheelbarrow used as a four-wheeled device in accordance with this invention.
Figure 9:
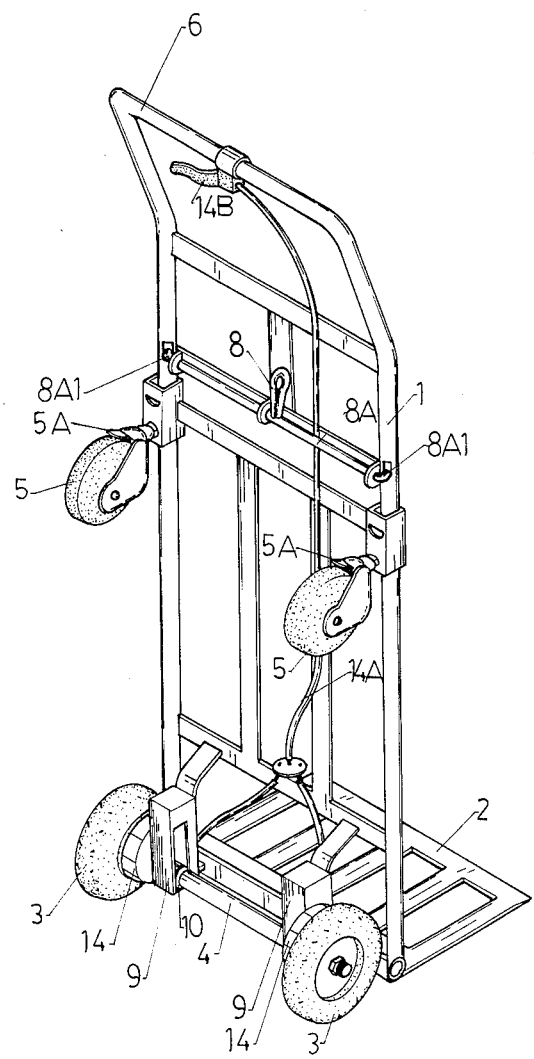
FIG. 9 is an outward view of this wheelbarrow in accordance with this invention.

The new wheelbarrow of the present invention, as shown in FIG. 9, comprises body 1, rack 2, front wheels 3, front wheel axle 4 and auxiliary rear wheels 5, as its main parts. Body 1 is composed of the rear section including push handle 6 and the front section combined with front wheels 3 and rear wheels 5. Rack 2 is constructed so as to be able to fold vertically, i.e., L-shaped, to the front section of body 1 or to lie on body 1, as shown in FIG. 2. The rear section of body 1 includes push handle 6 which can be folded to be vertical to the front section at the place where the two sections meet and axis bar 7 is located, as shown in FIG. 2. Alternatively, the handle 6 can lie on the front section, as shown in FIG. 2. When the wheelbarrow is to be used as to a two-wheeled device, the rear and the front sections of body 1 are arranged to become straight, as shown in FIGS. 1 and 9. When it is to be used a four-wheeled device, the rear section is to be folded 90 degrees or, in other words, vertical to the front section, and the two rear wheels are placed on the ground. When arranged as a four-wheeled device, the dimensions of the wheelbarrow can be changed by folding the rear section on the front section, as shown in FIG. 2. The folding of the rear section must be effected by depressing pulling stick 8 which makes movable blocks 1B disengage from controlling blocks 1A positioned inside the body pipes. Rack 2 must be moved to be vertical to the front section when using this wheelbarrow as a two-wheeled device, but can be moved so as to be vertical to the front section for carrying goods of short length or to lie on the front section for carrying goods of long length when used as a four-wheeled device. Thus, one of the advantages the wheelbarrow is that it possesses size or volume versatility for goods which can be carried thereon.

Figure 3:
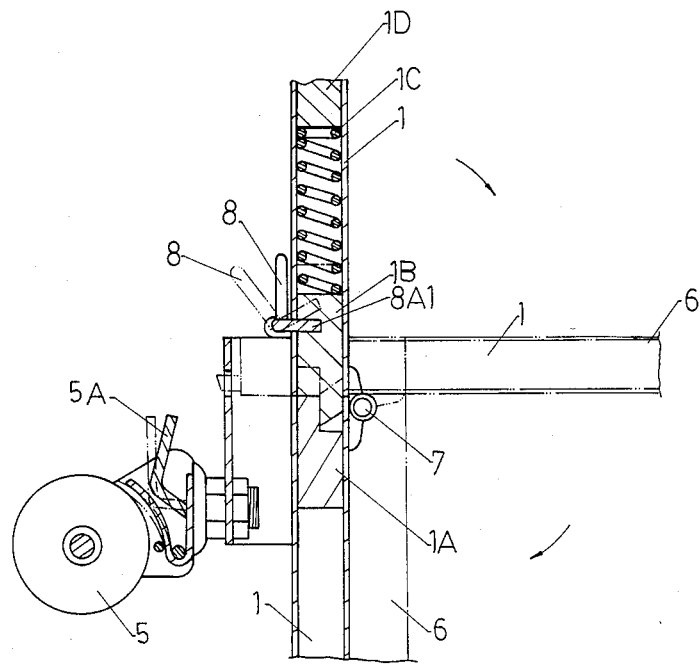
FIG. 3 is a structural view of the folding device for the two sections of the body and the auxiliary rear wheel of the wheelbarrow in accordance with this invention.

Each of the two auxiliary rear wheels 5 positioned under the rear part of the front section of body 1 are respectively provided with brake 5A, as shown in FIG. 3. This brake 5A can function to keep rear wheels 5 immovable by pushing it down with a foot, while the wheelbarrow is in a static position when used as a four-wheeled device. The folding device of the rear section of body 1 is illustrated in FIG. 3, but other kinds of structure can also be applied. It includes axis bar 7 positioned between both side pipes of the rear section and both side pipes of the front section at the abutting line of both sections for keeping both sections connected in a straight extended form, in a vertical form, or in a folded form. Nearly L-shaped controlling blocks 1A are fixed inside the ends of both side pipes of the front section to engage with nearly L-shaped movable blocks 1B positioned inside the ends of both side pipes of the rear section by action of springs 1C. Said blocks 1B abut against springs 1C which abut stopper 1D. Pushing ends 8A1 of controlling bar 8A are inserted into the holes of blocks 1B. Blocks 1B can be moved so as to be separated from controlling blocks 1A if pulling stick 8 is depressed to turn controlling bar 8A which pushes pushing ends 8A1 to move blocks 1B away from controlling blocks 1A. When movable blocks 1B have been separated from controlling blocks 1A, the rear section of body 1 can be folded 90 degrees to stand up vertical or 180 degrees to lie down forward on the front section from the straight-lined position. Thus, this wheelbarrow can be changed to become a two-wheeled device or a four-wheeled device or can be folded for storage, as shown in FIGS. 1 and 2.

Figure 4:
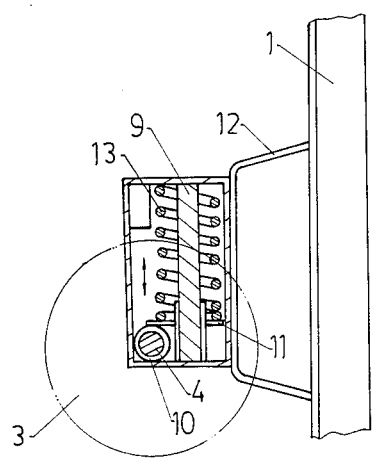
FIG. 4 is a cross-sectional view of the flexing case and the front wheel axle united together in accordance with this invention.
Figure 5:
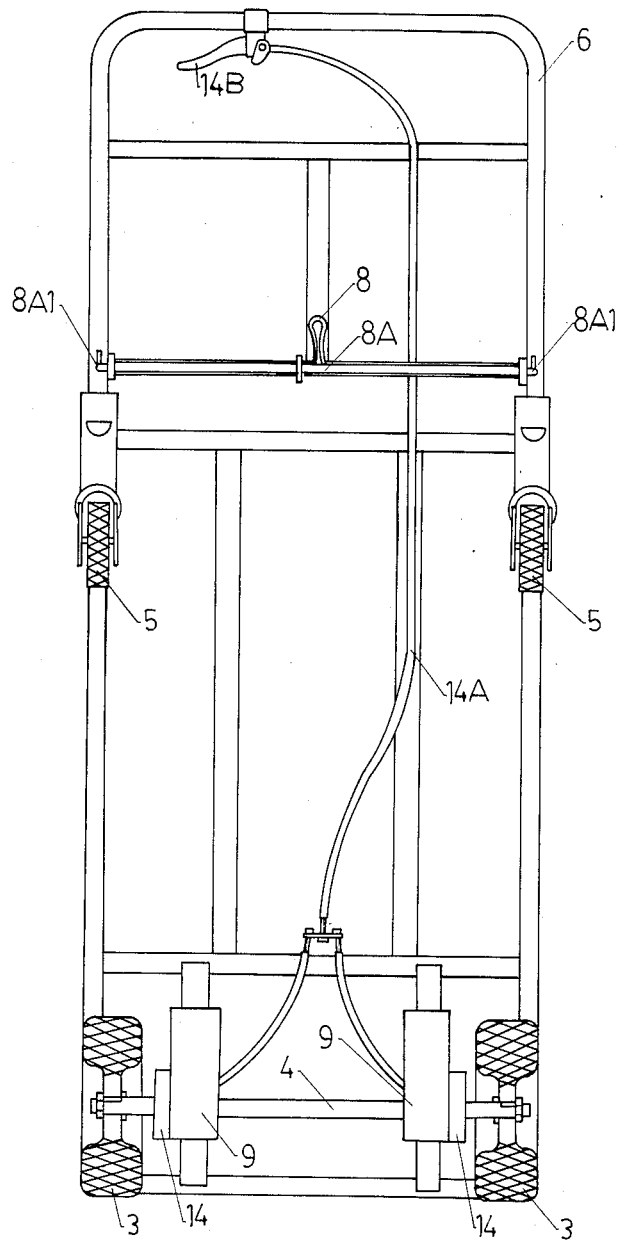
FIG. 5 is a bottom view of the wheelbarrow of this invention.
Figure 7:
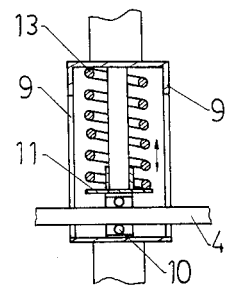
FIG. 7 is a across-sectional view of the flexing case of this invention.

Front wheel axle 4 is positioned under the front section of body 1 and turns within support bearing 10 provided in flexing case 9. It is noted that the front wheel axle can also be arranged so as not to revolve, while the front wheels revolve. Preferably both front wheels 3 are steadfastly fixed at both ends of front wheel axle 4, as shown in FIGS. 4, 5 and 7; and front wheel axle 4 is supported by and can turn within bearings 10 which are welded on their outside to pushing plates 11 positioned in flexing cases 9. Flexing cases 9 are connected to the front section of body 1 as one unit by means of extending suspenders 12. Inside flexing cases 9, pushing plates 11 are positioned against strong springs 13, so that front wheel axle 4 can move up and down through the elasticity of springs 13 which push or release pushing plates 11. For example, in loading this wheelbarrow as a two-wheeled device with rack 2 and with the straight body 1; rack 2 is pushed under the goods to be carried, and then push handle 6 is pulled down to raise up rack 2 from the ground with the goods thereon. In the process of levelling body 1, front wheel axle 4 of front wheels 3 can be pushed upward by action of the weight of the goods. This permits the fulcrum point of the front wheel axle to vary, and the result is that the amount of user force can be reduced. On the contrary, when unloading the goods, springs 13 can allow front wheel axle 4 to go down gradually until rack 2 touches the ground together with both front wheels 3 when positioning handle 6 upward for grounding rack 2. Thus, the user cannot only reduce the amount of force necessary, but also can reduce the amount possible danger in carrying, loading and unloading goods. This can be attributed to the special feature which the front wheels 3 posses and which cannot be found in other wheelbarrows.

Figure 6:
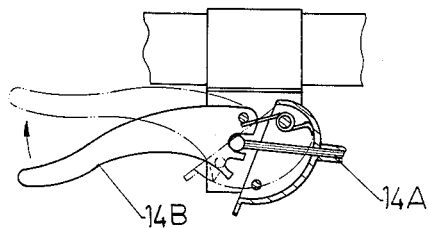
FIG. 6 is a view of the handle for the brakes of the front wheels of this invention.
Figure 8:
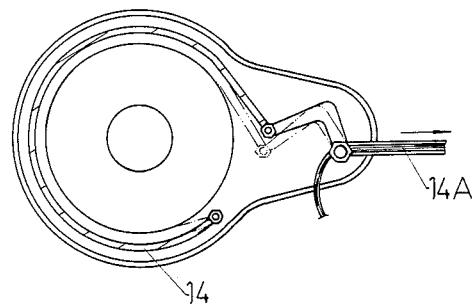
FIG. 8 is a view of the brake for the front wheel of this invention.

In addition, two braking devices 14 which work simultaneously for stopping front wheels are arranged on front wheel axle 4 between flexing cases 9 and front wheels 3, as shown in FIG. 5, 6 and 8. The barking devices are manipulated by brake handle 14B mounted on push handle 6. Wire rope 14A connects braking device 14 and brake handle 14B, in the same manner as the brakes used in bicycles. Consequently, when the wheelbarrow is used as a two-wheeled or four-wheeled device, its speed can be properly controlled or it can be stopped and thus operated in a steady condition whether on a flat, inclining or declining surface by the use of brake handle 14B. The possible configuration of the body, the position of brakes on both the front wheels and the position of the brake handle on the push handle endow this new wheelbarrow with characteristics, such as versatile utility, safe and steady movement, controllable speed, possibility of being kept in a static position and reducing the amount of user force necessary for operation.

What is claimed is:

1. An improved wheelbarrow capable of being used as a two-wheeled and a four-wheeled device which comprises:
    a body having a front section, an axis bar and a rear section, the rear sections having a handle including pipes; the front section including pipes, two front wheels and two rear wheels each rotatably mounted on the front section pipes, and braking devices for the two front wheels; the pipes of the front and rear sections each having one end pivotally attached to the axis bar,
    a folding device for permitting the push handle of the front section to pivot about the axis bar, the folding device including controlling blocks arranged in the one end of the pipes of the front section, movable blocks and springs arranged within the one end of the pipes of the handle so that the springs force the movable blocks against the controlling blocks in an engaging relationship, and a pulling stick arranged to release the force of the springs, so that the movable blocks and controlling blocks can be disengaged and the push handle can be pivoted to at least one of three positions including a first position of the push handle being an extension to the front section when the wheelbarrow is used as the two-wheeled device, a second position of the push handle being vertical to the front section when the wheelbarrow is used as the four-wheeled device, and a third position of the push handle being folded on the front section for storage of the wheelbarrow, and
    a rack for one of loading and unloading arranged on the front section at an end opposite the folding device.

2. The improved wheelbarrow as claimed in claim 1, wherein flexing cases are provided for mounting the two front wheels on the front section, an axle joins the two front wheels together and the axle passes through the flexing cases, the flexing cases have a pushing plate abutting the axle and a spring biasing the pushing plate against the axle for providing elastic movement of the front axle thereby changing its fulcrum and reducing a force needed in loading an unloading the wheelbarrow when used as the two-wheel device.

* * * * *